Aug. 22, 1933.　　　S. G. ROUSSEAS　　　1,923,589
AGITATING PLUNGER COCK
Filed July 30, 1932
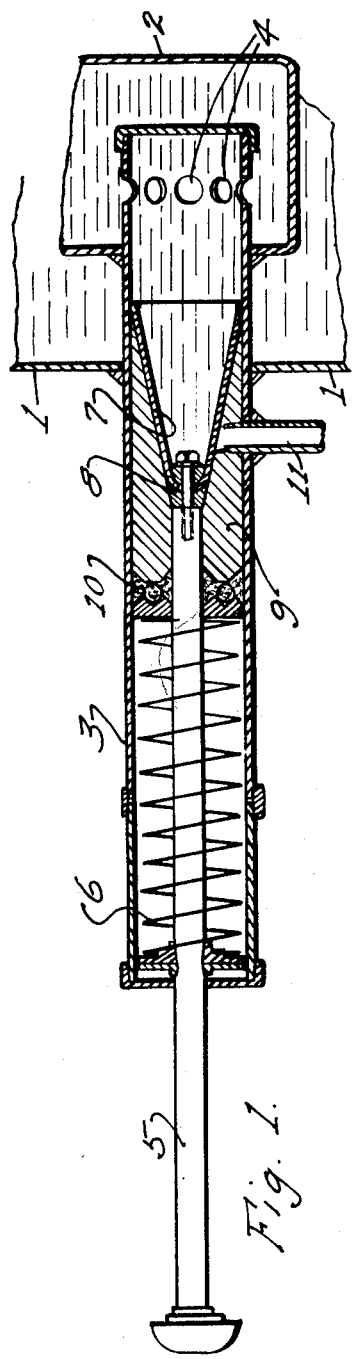
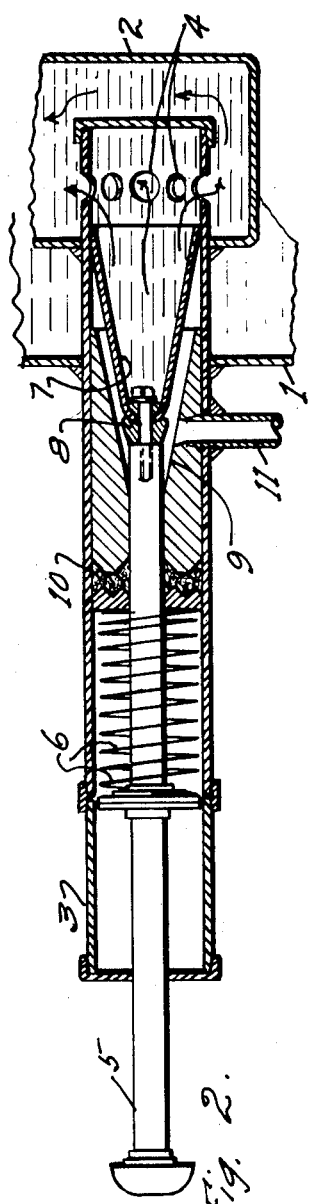
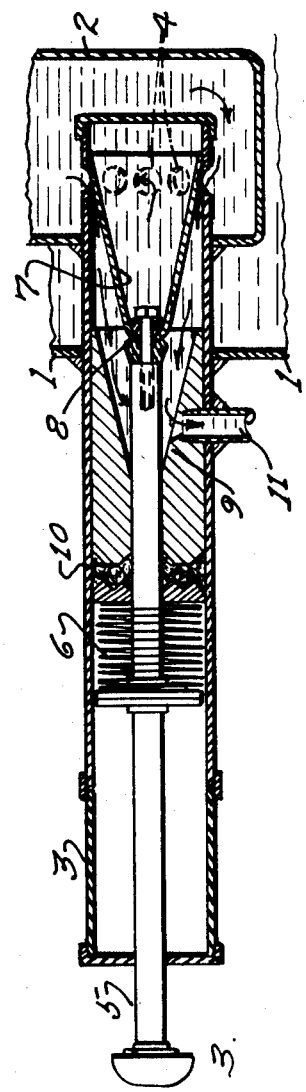
INVENTOR
SARANTIS G. ROUSSEAS.
BY
Hauff & Sharland.
ATTORNEYS Patented Aug. 22, 1933

1,923,589

UNITED STATES PATENT OFFICE 1,923,589

AGITATING PLUNGER COCK

Sarantis G. Rousseas, Hempstead, N. Y.

Application July 30, 1932. Serial No. 626,533

3 Claims. (Cl. 225—23)

My invention relates to a plunger cock and has for its object the provision of a device of the character described which is provided with means for agitating the body of liquid with which it is used. My device has particular application to coffee urns.

Coffee, as it is now brewed in restaurants, is either left in an urn in contact with the coffee grounds or is placed in a separate container. In either case it is usually surrounded by a jacket of hot water. The coffee is constantly steaming and this steam condenses on the lid of the container. The water so formed runs back into the coffee. The liquid coffee, being in a stagnant condition, does not mix thoroughly with this condensed steam. Consequently, the strength of the coffee is not uniform and varies as it is consumed. Where the liquid coffee is in contact with coffee grounds, it becomes stronger as it is consumed; on the other hand, where the liquid coffee is not in contact with coffee grounds, it becomes weaker as it is consumed by reason of the condensed steam remaining near the surface.

The main object of my invention is to provide a device of the character described which will cause a circulation of the coffee in the container as each cup of coffee is drawn therefrom.

Further objects and advantages of my invention will appear from the following detailed description of the accompanying drawing, in which Fig. 1 is a vertical section through the plunger cock in closed position; Fig. 2 is a vertical section through the plunger cock in circulating position; and Fig. 3 is a vertical section through the plunger cock in open position.

Referring to the drawing in detail, 1 represents the wall of the coffee urn and 2 represents a well at the lower end of the coffee container which is spaced from the walls of the urn so as to provide for a water jacket. The plunger cock comprises a tube 3 having closed ends and passing through the outer wall of the urn and projecting into the well 2. That portion of the tube which is inside the well 2 is provided with openings 4 around its circumference at a point adjacent the closed end of the tube. Passing through the other end of the tube is a rod 5, normally held in its outermost position by a spring 6 and carrying at its inner end a cone shaped plunger 7 which is connected to said rod by a swivel joint 8, and which is provided with a conical seat 9 mounted in the tube 3. Surrounding the rod 5, at a point adjacent the plunger, is packing material 10 which serves to prevent liquid from passing beyond the desired point. The seat 9 snugly embraces the rod 5 on both sides of the packing to provide further protection and to serve as a guide for the rod. The purpose of the swivel joint 8 between the plunger 7 and the rod 5 is to make the plunger self-centering in the tube 3. The plunger 7 can be hollow or solid, and if hollow can have its free end open or closed. The embodiment shown in the drawing is a hollow plunger with its free end open. Passing through the wall of the tube 3 and through the valve seat 9 is a tube 11 which serves as the liquid outlet.

The manner in which my new plunger cock operates is apparent from Figs. 1, 2 and 3. As shown in Fig. 1, the plunger, when the cock is in closed position, rests snugly on its seat and permits a certain amount of liquid coffee to enter the tube 3. When the rod is pushed in to draw a cup of coffee, the coffee, already contained in the tube, is first of all forced against the closed inner end of tube 3 and out through the openings 4, thereby setting up a pronounced circulation of the coffee. The circulation of the coffee continues until the large end of the plunger passes the openings 4, at which time the coffee passes through the openings 4 around the outside of the plunger and through outlet 11. When the desired portion of coffee has been drawn, the rod is released and the cock is immediately closed by the action of spring 6. It is apparent that, as each cup of coffee is dispensed, the coffee in the container circulates and remains of uniform quality throughout the dispensing operation until it is completely consumed.

Having thus described the nature and objects of my invention and illustrated a preferred embodiment of the same, which embodiment is to be taken as illustrative rather than limitative, what I claim as new and desire to secure by Letters Patent is:

1. A plunger cock of the character described, comprising a tube having closed ends, one of which is adapted to be projected into the liquid to be dispensed, and the other of which is adapted to project outside the container of said liquid, a series of perforations around the circumference of said tube at a point adjacent the inner closed end, a plunger arranged in said tube, behind and in spaced relation to said perforations, a liquid outlet from said tube, behind and in spaced relation to said plunger, and a plunger rod extending from said plunger through the outer end of said tube.

2. A plunger cock of the character described, comprising a tube having closed ends, one of which is adapted to be projected into the liquid to be dispensed, and the other of which is adapted to project outside the container of said liquid, a series of perforations around the circumference of said tube at a point adjacent the inner closed end, a conical plunger having its largest circumference in sliding contact with the wall of said tube arranged behind and in spaced relation to said perforations with its largest diameter adjacent said perforations, a liquid outlet from said tube behind and in spaced relation to said plunger, and a plunger rod extending from said plunger through the outer end of said tube.

3. A plunger cock of the character described, comprising a tube having closed ends, one of which is adapted to be projected into the liquid to be dispensed, and the other of which is adapted to project outside the container of said liquid, a series of perforations around the circumference of said tube at a point adjacent the inner closed end, a hollow conical plunger arranged in said tube behind and in spaced relation to said perforations, the largest diameter of said plunger being in sliding contact with the wall of the tube and being adjacent said perforations whereby, when said plunger is pushed inwardly, it forces liquid out of the tube through said perforations and into the liquid container until the largest circumference of said plunger passes said perforations, at which time liquid will run from said container through said perforations behind said plunger, a liquid outlet from said tube behind and in spaced relation to said plunger, and a plunger rod extending from said plunger to the outer end of said tube.

SARANTIS G. ROUSSEAS.